Patented Aug. 20, 1929.

1,725,612

UNITED STATES PATENT OFFICE.

JOHN C. BLACK, OF DESTREHAN, LOUISIANA, WIRT D. RIAL, OF LOS ANGELES COUNTY, AND JOHN R. McCONNELL, OF WHITTIER, CALIFORNIA, ASSIGNORS TO PAN AMERICAN PETROLEUM COMPANY, OF LOS ANGELES, CALIFORNIA, A CORPORATION OF CALIFORNIA.

PROCESS OF REMOVING ACID-REACTION PRODUCTS FROM OIL.

No Drawing. Original application filed October 13, 1926, Serial No. 141,421. Divided and this application filed October 13, 1926. Serial No. 141,422.

This application is a division of application No. 141,421 filed Oct. 13, 1926.

The process of this application is directed to a method of purifying oils, particularly to a method of treating oils in which the oil is treated with an acid, such as sulphuric acid for the purpose of improving the quality of the oil.

As is well known, petroleum distillates are treated with sulphuric acid for the purpose of removing bodies present in the distillates, which bodies impart objectionable qualities to the oil. The treatment of the oil with sulphuric acid converts certain portions of the oil into a heavy, tarry material, which settles out from the oil if allowed to stand. This product is termed "acid sludge." The oil, however, contains, even after prolonged settling, considerable acid material. For instance, it contains a coarse suspensoid of sulphonated bodies, and minute, almost colloidal particles of free sulphuric acid. This dispersion of acid material in the oil is termed "peppery sludge."

It is desirable to remove as much of this acid material as possible before treating with a neutralizing medium, in order that the amount of neutralizing medium necessary shall be reduced to as low a point as possible.

It is therefore an object of our invention to devise a method for removing this residual acid material which remains dispersed in the oil after the settling of the acid sludge.

We have found that pitches, such as petroleum pitches, for instances, asphalt, petroleum coke, and coal tar pitches, act to agglomerate and coagulate this peppery sludge. The preferred pitches are the hard pitches or coky tars. For instance petroleum coke, hard asphalts such as 1 or 2 penetration, hard coal tar pitches etc. may be employed. On treating an oil containing this peppery sludge with these pitches, a coky, tar-like product is obtained, while the remaining oil is purified and substantially free of the peppery sludge.

As an example, illustrative of the method of carrying out this invention, the following may be given: Lubricating oil which has been acid treated and has had the acid sludge removed, and which contains the peppery sludge, is treated with about 1 or 2% of pitch, for instance a hard coal tar pitch or a petroleum pitch such as 1 or 2 penetration asphalt or petroleum coke, and the mixture heated to about 300° F.

The mixture is agitated to insure uniform treatment of the oil with the pitch. A coky, tar-like residue is obtained which settles out and is removed. The oil free of peppery sludge may be further treated with a neutralizing and with a decolorizing medium or a decolorizing medium alone.

The pitch may be introduced in either a liquid or a solid condition. In employing the pitch in a liquid form, the melted pitch is introduced into the oil, heated above or at the melting point of the pitch, the mixture is then heated if necessary, to 300° F. more or less, uniform admixture of the oil and pitch insured, and the treatment finished as above described.

It will be found that the amount of neutralizing medium employed is considerably less than that which must be employed if the peppery sludge is not first agglomerated by the treament above described. It will be found that by employing sufficient amount of the agglomerant the oil may be rendered free of acid bodies and be neutral. We also found that the reaction is affected where heat is applied but will operate at ordinary temperatures. The amount of agglomerant employed depends on the viscosity of the oil, the amount of peppery sludge in the oil and on the temperature.

The pitch, however, may be employed in a solid condition, in which case the pitch is disintegrated into a powder of about 60 mesh. It is then introduced into the oil, treated as above described.

If a decolorizing and neutralizing clay is employed in the purification of the oil, the oil, after the removal of the acid sludge, may be treated with a mixture of neutralizing and decolorizing clay containing the required proportion of powdered pitch. The oil is heated to about 300° F. more or less, as is usual in the treatment with neutralizing and decolorizing clay, and it will be found that the peppery sludge is agglomerated and coalesced, and that the amount of neutralizing clay necessary is less than that which must be employed if the pitch were not used.

We claim:

1. A process of purifying petroleum oil distillates, comprising, treating a petroleum oil distillate with sulphuric acid, separating the acid sludge, and treating the separated oil with a coal tar pitch to precipitate the peppery sludge remaining in the oil.

2. A process of purifying petroleum oil distillates, comprising, treating a petroleum oil distillate with sulphuric acid, and treating the acid treated oil with a coal tar pitch to separate the acid reaction products present in the oil and removing the thus purified oil.

3. A process of purifying petroleum oil distillates, comprising, treating a petroleum oil distillate with sulphuric acid, and treating said acid treated oil with a coal tar pitch at an elevated temperature to precipitate acid reaction products in said oil.

4. A process of purifying petroleum oil distillates, comprising, treating a petroleum oil distillate with sulphuric acid, separating the acid sludge, and treating the said separated oil at an elevated temperature with a coal tar pitch to precipitate the peppery sludge remaining in the oil and separating the purified oil from said precipitate.

JOHN C. BLACK.
WIRT D. RIAL.
JOHN R. McCONNELL.